United States Patent [19]

Cain et al.

[11] Patent Number: 5,409,719

[45] Date of Patent: Apr. 25, 1995

[54] LOW-CALORIE FILLING COMPOSITIONS

[75] Inventors: Frederick W. Cain, Voorburg; Laurentius F. J. van Dongen, Zaandam, both of Netherlands; Thanh V. Lu, Little Billing, Great Britain; Martin J. Izzard, Rushden, Great Britain; Kevin W. Smith, Bedford, Great Britain

[73] Assignee: Van Den Bergh Foods Co., Division of Conopco, Inc., Lisle, Ill.

[21] Appl. No.: 987,930

[22] Filed: Dec. 9, 1992

[30] Foreign Application Priority Data

Dec. 18, 1991 [EP] European Pat. Off. ......... 91311729.7
Aug. 24, 1992 [EP] European Pat. Off. ......... 92307714.3
Sep. 18, 1992 [EP] European Pat. Off. ......... 92308520.3

[51] Int. Cl.$^6$ ........................... A23G 3/00; A23D 7/06
[52] U.S. Cl. .................................... 426/103; 426/604; 426/660; 426/804
[58] Field of Search ............... 426/572, 602, 604, 607, 426/659, 660, 804, 103, 104

[56] References Cited

U.S. PATENT DOCUMENTS

| | | | |
|---|---|---|---|
| 4,081,559 | 3/1978 | Jefferey et al. | 426/660 |
| 4,410,552 | 10/1983 | Gaffney et al. . | |
| 4,410,555 | 10/1983 | Richardson . | |
| 4,461,777 | 7/1984 | Murase et al. | 426/572 |
| 4,466,983 | 8/1984 | Cifrese | 426/103 |
| 4,478,867 | 10/1984 | Zobel et al. | 426/572 |
| 4,610,884 | 9/1986 | Lewis | 426/613 |
| 4,810,516 | 3/1989 | Kong-Chan | 426/804 |
| 4,818,553 | 4/1989 | Holscher | 426/602 |
| 5,017,392 | 5/1991 | Bombardier et al. | 426/659 |
| 5,069,915 | 12/1991 | Devitt et al. . | |
| 5,104,680 | 4/1992 | Padley et al. . | |
| 5,120,563 | 6/1992 | Mohlenkamp | 426/601 |
| 5,147,670 | 9/1992 | Cebula | 426/99 |
| 5,158,798 | 10/1992 | Fung | 426/603 |
| 5,171,604 | 12/1992 | Weyland et al. . | |

FOREIGN PATENT DOCUMENTS

| | | | |
|---|---|---|---|
| 285469 | 12/1990 | Germany | 426/572 |
| 54-20010 | 2/1979 | Japan | 426/572 |

OTHER PUBLICATIONS

European Search Report in a corresponding European Patent Application EP 92203625.4.
Derwent Abstract of JP 54140773; Nov. 1, 1979.
European Search Report in a corresponding European Patent Application EP 91311729.
Derwent Abstract of JP 58 152 448, Sep. 10, 1983.

Primary Examiner—Michael W. Ball
Assistant Examiner—Daniel J. Stemmer
Attorney, Agent, or Firm—Cushman, Darby & Cushman

[57] ABSTRACT

The invention concerns low-calorie confectionery fillings, wherein 5–50 wt. % of fat are present in a fat-continuous emulsion. The water phase comprises 10–60 wt. % of water, while the remainder (90–40 wt. %) consists of: acidity regulator, thickener, bulking agent, emulsifier, sweetener, flavour, colourant, humectant, and/or preservative.

24 Claims, No Drawings

LOW-CALORIE FILLING COMPOSITIONS

Confectionery compositions suitable for chocolate fillings are known from our Australian Patent Application 54,868/90. As the watercontent of the aqueous phase of these emulsions is high (about 75 wt % or more), these compositions must comprise a hard fat emulsion with a C-value according to Haighton of at least 1600 at 20° C. in which the dispersed aqueous phase has a particle size not exceeding 50 $\mu$m, for else leakage problems will arise at the application of the compositions as filling fat. Further, a barrier-layer is necessary as is illustrated by all the examples. The fat content of the emulsion is 20–50 wt %.

The hard fats that can be used in these emulsions are vegetable fats rich in 2-oleyltriglycerides of palmitic and/or stearic acid. Suitably, these fats are obtained from e.g. cocoa butter, illipe, shea, palm or sal fat. It is also possible to use a hard fat made by enzymatic rearrangement of natural or synthetic fat.

In order to meet the requirement of the C-value, higher-melting (i.e. stearin) or mid-fractions of the above fats have to be used.

From U.S. Pat. No. 4,410,552 encapsulated fillings are known, in which the filling has a low density as a result of expansion of the filling by introduction of a gas into the filling. The maximum water content of these fillings is 20 wt %. In this way, stable products are obtained that display enhanced mouthfeel and taste properties, the fillings, however, have to be aerated.

We have now found new low-calorie filling compositions that have a lower caloric value compared to the compositions mentioned above and which still lead to very good results when applied in confectionery.

Therefore, our invention concerns in the first place low-calorie confectionery filling compositions provided with a coating layer, representing 0–60 wt % of the total product, wherein the filling composition comprises a fat-continuous emulsion with a fat content of 5–50 wt % while the water content of the remainder is 10–60 wt %, and the remainder further consists of 90–40 wt % of at least one of the following components: acidity regulator, thickener, bulking agent, emulsifier, sweetener, flavour, colourant, humectant and preservative.

Preferred confectionery filling compositions are those, wherein the fat-continuous emulsion is not aerated.

In this specification, unless otherwise indicated, the term 'fat' refers to edible fatty substances in a general sense, including natural or synthesized fats and oils consisting of essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as, for example, waxes, e.g. jojoba oil and hydrogenated jojoba oil, and polyol fatty acid polyesters referred to hereinafter in more detail. The terms fat and oil are used interchangeably.

In this specification, the term 'polyol' is intended to refer to any aliphatic or aromatic compound which comprises at least four free hydroxyl groups. Such polyols in particular include the group of sugar polyols, which comprises the sugars, i.e. the mono-, di- and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, cellobiose, raffinose, sucrose, erythritol, mannitol, lactitol, sorbitol, xylitol and alpha-methylglucose. A generally used and preferred sugar polyol is sucrose.

In this specification, the term 'polyol fatty acid polyester' is intended to refer to any such polyesters or mixtures thereof of which, on an average, more than 70% of the polyol hydroxyl groups have been esterified with fatty acids. In this specification, by 'indigestible' is meant that at least about 70% by weight of the material concerned is not digested by the human body.

Preferably, the fat is a vegetable fat. Vegetable polyol fatty acid esters are polyol fatty acid polyesters derived from fatty acids of vegetable origin.

Although the fat content is not critical, it is essential, considering the purpose of low-calorie compositions, that the amount of fat should not exceed 50 wt. % and should preferably be 5–40 wt. %, most preferably 10–30 wt. %, of the total filling composition.

The water content of the remainder cannot be chosen freely because too high a water content, i.e. above 60 wt. %, will lead to undesirable product properties, such as a watery mouthfeel, and a diffusion of moisture to the coating of the confectionery product, resulting in collapse of the product. Therefore, the water content of the remainder of the fat emulsion is 10–60 wt. %, preferably 10–50 wt %, most preferably 15–25 wt. %. The water content of the total composition is preferably 5–57 wt. %.

At the same time, the pH of the emulsion should preferably not exceed 5.5. In this way, a good bacteriological behaviour can be combined with a good taste and good water loss properties.

In order to combine fat contents of less than 50 wt. % with water contents of the remainder of a maximum of 60 wt. %, other components should be present in the emulsion. Such components should be chosen on the basis of their ability to form a water-in-oil emulsion displaying the required calorie-reducing, emulsifying properties and pH as defined above.

It has been found that the above requirements can be fulfilled when at least one of the following components is present in the remainder of the emulsions: acidity regulator, such as citric acid; thickeners, such as proteins, e.g. gelatin, hydrolyzed gelatin, casein, caseinates, vegetable proteins or denatured proteins from any known source, carbohydrates, e.g. potato starch, corn starch, maize starch, tapioca starch, xanthan gum, the different carrageenan gums, pectin, agar, polydextroses, maltodextrins, hydrolyzed starches and modified starches.

The amounts in which the thickeners can be present vary from 0–70 wt. %, preferably 0.2–30%, most preferably 5–25 wt. %. The thickeners can perform gelling properties, in which case the thickener is present in 1–8 times its critical gelling concentration.

As the presence of gelatin in the remainder is a drawback, as gelatin is expensive and also the presence of gelatin means that the composition is not kosher, we have also studied how we could avoid to use gelatin.

This has resulted in another embodiment of our invention, according to which the low calorie confectionery filling compositions, provided with a coating layer, according to the invention comprise fat-continuous emulsions with a fat content of 5-50 wt %, while the remaining 95-50 wt % of the emulsions comprise:
10-60 wt % water
90-40 wt % thickener, other than gelatin, optionally admixed with and one or more of the components of the group consisting of: acidity regulator, bulking agent, emulsifier, sweetener, flavour, colourant, humectant and preservative in which emulsions the weight ratio $$\frac{\text{thickener} + \text{sweetener}}{\text{water}} > 1.5.$$

The thickeners that can be applied are selected from the group consisting of:
proteins, such as: caseine, caseinates, vegetable proteins and denatured proteins
carbohydrates, such as: potato starch, corn starch, maize starch, tapioca starch, xanthan gum, the different carrageenan gums, pectin, agar, the maltodextrins, hydrolyzed starches and modified starches.

Very good low calorie fillings are obtained when the thickener consists of polydextrose, optionally admixed with maltodextrin and/or sweetener. In particular, very suitable, low calorie confectionery filling compositions are obtained, when the weight ratio $$\frac{(\text{polydextrose} + \text{maltodextrin} + \text{sweetener})}{\text{water}}$$

in the emulsion is 2-9. In the most preferred low calorie confectionery filling composition polydextrose and maltodextrin are present in a weight ratio of more than 0.7.

Another component that can be used in the emulsion is a bulking agent. Bulking agents are, among other things, powdered or microcrystalline cellulose, insoluble fibres, such as cocoa powder, plant fibres, such as fibruline®, Avicel®, oat fibres or mixtures thereof. The amount of bulking agent is in general 0-50 wt. %, preferably 15-40 wt. %.

Emulsifiers can also be present in the compositions. These emulsifiers can be any known emulsifier, but are suitably chosen from the monoglycerides, such as hymonos (Quest International), lecithins, DATA esters (=diacetyl tartaric acid esters), lactodans (=glycerol lactic esters) or mixtures thereof. The amount of emulsifier is 0.1-2 wt. %, preferably 0.2-1.5 wt. %.

Sweeteners are another group of important ingredients that provide the possibility of regulating the caloric intake of the emulsions. Suitable sweeteners are sucrose, lactose, fructose, glucose, but also high-intensity sweeteners, such as aspartame, saccharin, acesulfame-K, sucralose or alitame can be used. The preferred amount of sweeteners is 0.005-60 wt. %, while this amount is only 0.005-10 wt. % when a high-intensity sweetener is used.

The use of a humectant also provides the possibility of regulating the caloric intake and the other properties of the filling composition. Very suitable humectants are glycerol and hygroscopic, food-grade, inorganic or organic salts. The humectants are preferably present in amounts of 0-70 wt. %, in particular 15-40 wt. %, of the remainder.

Other components that can be present in the emulsions are flavours, colourants and preservatives. The preservatives are preferably present in amounts of 0.005-4 wt. % and are suitably selected from sorbate salts, benzoate salts, ascorbic acid, urea or its derivatives.

The above-mentioned components are used in such amounts, within the ranges mentioned above, that a low-calorie filling composition is obtained that is microbiologically and structurally stable at ambient temperature for at least 4 weeks, preferably for more than 12 weeks.

It should be noted here that by a fat-continuous emulsion also bi-continuous emulsions should be understood in which there are areas of water-continuous emulsions, but the bulk of the emulsion is predominantly fat-continuous. Also duplex emulsions are other examples of fat-continuous emulsions; water droplets are present therein that contain very small fat particles themselves.

The fats that are preferably used can advantageously be selected or derived from soft fractions of cocoa butter, illipe, shea, palm, sal, soybean, cottonseed, palmkernel, coconut, rapeseed, sunflower etc. We can also use fats, made by hardening or interesterifying (chemically or enzymically) of these fats, or mixtures thereof. In particular, the softer fractions (=olein fractions) of these fats are very useful.

The fats preferably display an NMR-SFI profile (NMR pulse, stab.) according to $N_5=10$–95, $N_{20}=10$–90, $N_{35}=<5$.

In a further embodiment of the above finding we have found that the nature of the fat applied in terms of its ratio $N_{25}$ (stab): $N_{25}$ (not-stab) and its $N_{20}$ (stab) value has an enormous impact on the properties of the compositions. Therefore our invention further concerns low calorie confectionery filling compositions, provided with a coating layer, representing 0-60 wt % of the total product, wherein the filling composition comprises a fat-continuous emulsion with a fat content of 10-30 wt %, while the remaining 90-70 wt % of the emulsion comprises: 10-60 wt % water and 40-90% thickener, optionally admixed with one or more of the components of the group consisting of: acidity regulator, bulking agent, emulsifier, sweetener, flavour, colourant, humectant and preservative, in which emulsion the fat applied displays a $$\frac{N_{25} \text{ (stab)}}{N_{25} \text{ (not-stab)}} \geq 1.5 \text{ and an } N_{20} \text{ (stab) of less than 70.}$$

The fats that give the best products display a ratio $N_{25}$ (stab): $N_{25}$ (not-stab) of at least 1.8. The preferred $N_{20}$ (stab) is less than 65. Any kind of fat, fulfilling above requirements can be applied. Preferred fats are, however, polymorphic fats. Typical examples are mixtures of cocoabutter or cocoabutter equivalents with other fats, preferably with at least 10 wt % of butterfat or butter fat fractions. However, the use of mixtures of palm oil mid-fraction and palm oil olein (=in ratios of 80:20-20:80) also gives excellent results.

The N-values of the fats are measured according to a standard pulse, NMR-technique. The N-values of the fats are measured both without and after stabilization. Unstabilized means that the N-value is measured after the following regime: melt at 80° C.; 30 minutes at 60° C.; 1 hour at 0° C.; 30 minutes at measurement temperature 25° C. Stabilized fats were measured after: melt at 80° C.; 15 minutes at 60° C.; 60 minutes at 0° C.; 16 hours at 26° C.; 24 hours at 20° C.; 60 minutes at 0° C.; 60 minutes at measurement temperature 25° C. (or other measurement temperature). It is preferred to apply a fat with an $N_{20}$ (stab) of at least 35.

The N-ratio and $N_{20}$ (stab) ensures that the shelf-life of encapsulated products is increased compared with shelf-life when using fats that are outside this, in addition this improves the processability of the emulsion mixtures.

By using the filling fat compositions according to the invention, a calorie reduction relative to conventional filling fat compositions of 50% or more can be achieved. The best results as regards stability and taste properties are obtained when the particle size of the thickeners and/or bulking agents that are applied is between 0.1 and 50 μm, in particular between 1 and 20 μm.

The filling compositions will preferably be used in encapsulated form when applied in confectionery products. By the expression "encapsulated" is meant that the filling composition is surrounded by a coating layer or shell, preferably consisting of, or containing, chocolate. In these cases the shell, in particular, the chocolate shell represents 20–50 wt % of the total product. If the use of the filling compositions in shells still might lead to problems of collapse of the shell, these problems can be overcome by separating the filling composition from the shell or coating material by a barrier layer, preferably a barrier layer having a watervapour-permeability of less than 3 g. mil/m².d. mm Hg Examples of barrier materials that can be used are: Shellac, hard fat having an $N_{20}>50$ (NMR pulse, stabilized), natural wax, such as beeswax, Candillia Wax, Carnauba Wax, combinations of fat and sugars and high-melting sucrose poly fatty acid esters having an $N_{20}>50$.

The invention will now be illustrated by the following Examples:

EXAMPLE 1

Two fillings were produced having 23% of fat, with the formulations given in the Table below. The fat had $N_5=37$, $N_{20}=12$ and $N_{35}<2$.

|  | Filling A | Filling B |
| --- | --- | --- |
| Fat phase |  |  |
| Fat | 22.4 | 22.4 |
| Monoglyceride emulsifier** | 0.6 | 0.6 |
| Aqueous |  |  |
| Gelatin 270 bloom | 1.54 | 1.54 |
| Maltodextrin* | 4.62 | 4.62 |
| Polydextrose: Litesse | 0.00 | 34.65 |
| Potassium sorbate | 0.15 | 0.15 |
| Aspartame | 0.02 | 0.02 |
| Flavour | 0.85 | 0.85 |
| Water | 69.82 | 35.17 |
| Lactic acid | to pH 4.9 | to pH 4.9 |

*Paselli SA2 ®
**Hymono 7804 (Quest International)

Both fillings were processed by making a premix at 60° C. passing the premix through a Votator ® C-unit (pin stirrer) operating at 1000 rpm., then through two Votator ® A-units (scraped surface heat exchangers) operating at 155 and 1400 rpm, respectively, and finally through two further Votator ® C-units, operating at 1400 and 900 rpm, respectively. The product flow rate through the system was 25 g/minute. Processing temperatures (exit-temperatures) for the five units were 39° C., 5° C., 6° C., 9° C. and 20° C., respectively.

The fat continuity of the fillings was confirmed by conductivity measurements and also by spraying a mixture of powdered dyes on to the products. The dyes used were Malachite Green and Sudan III. The former dye is water-soluble and the latter is fat-soluble. Thus, a fat-continuous product dissolves the Sudan III, giving a red-orange colour. Similarly, a water-continuous product dissolves the Malachite Green, giving a blue-green colour.

Both filling A and filling B gave a red-orange colour when sprayed with the dye mixture, indicating that a fat-continuous product is involved.

The fillings were deposited into milk chocolate shells (Felchin ® ⅝" milk chocolate half-shells) which were then backed off and sealed with milk chocolate. The filled shells were stored at 20° C. and monitored visually for changes.

After 1 week, shells containing filling A had cracked and filling was escaping. Shells containing filling B, however, did not crack in the same way until after 4 weeks' storage.

The calorie content of both fillings was less than 300 kcal/100 g compared to 400–600 for normal fat-based confectionery fillings.

EXAMPLE 2

Chocolate shells (Felchin ® ⅝" milk chocolate half-shells) were coated inside with shellac by a process of filling the shells with ethanolic shellac solution, decanting off and drying.

Fillings were prepared as in Example 1 and deposited into the prepared shells. These were backed off and stored as before.

After 4 weeks, shells containing filling A had cracked but those containing filling B had not cracked until after 16 weeks.

EXAMPLE 3

Example 1 is repeated, with the fat being replaced by a 25:75 (weight) mixture of a sucrose fatty acid polyester derived from a blend of 55% of fully hydrogenated soybean oil (slip melting point 65° C.) and 45% of touch hardened soybean oil (slip melting point 28° C.), the polyester having a degree of conversion of over 95% and N-values of 63 at 20° C., 42 at 30° C. and 11 at 37° C., and a sucrose fatty acid polyester derived from touch hardened soybean oil (slip melting point 28° C.) having a degree of conversion of over 95% and fully liquid at the above ambient temperature.

EXAMPLE 4

A filling was produced having 22.3% of fat, with the formulations given in the Table below. The fat had $N_5=37$, $N_{20}=12$ and $N_{35}<2$.

|  | Filling |
| --- | --- |
| Fat phase |  |
| Fat | 22.3 |
| Monoglyceride emulsifier (Hymono 7804) | 0.6 |
| Aqueous |  |
| 63 DE-Corn Syrup | 23.0 |
| Polydextrose-Litesse | 34.0 |
| Potassium sorbate | 0.15 |
| Colour | 0.02 |
| Flavour | 0.11 |
| Water | 19.8 |

The prepared premix was held in a premix tank at 70° C. The filling was processed by passing through a Votator® C-unit (pin stirrer) operating at 1000 rpm., then through a Votator® A-unit (scraped surface heat exchanges) operating at 350, and finally through a further Votator® C-unit, operating at 700 rpm. The product flow rate through the system was 19 g/minute. Processing exit temperatures for the three units were 50°, 8° and 16° C., respectively. The fat continuity of the filling was confirmed by conductivity measurements and also by spraying a mixture of powdered dyes on to the products. The dyes used were Malachite Green and Sudan III. The former dye is water-soluble and the latter is fat-soluble. Thus, a fat-continuous product dissolves the Sudan III, giving a red-orange colour. Similarly, a water-continuous product dissolves the Malachite Green, giving a blue-green colour.

The filling gave a red-orange colour when sprayed with the dye mixture, indicating that a fat-continuous product is involved; this was also confirmed by confocal scanning laser microscopy.

The filling was deposited into milk and dark chocolate shells (Felchin® ⅜" chocolate half-shells) which were then backed off and sealed with chocolate. The filled shells were stored at 20° C. and 10° C. and monitored visually for changes.

After 6 weeks, at 20° C. the shells cracked and filling was escaping. At 10° C. the fillings did not crack until after 4 months' storage.

The calorie content of the filling was 350 kcal/100 g compared to 400–600 for normal fat-based confectionery fillings.

EXAMPLE 5

Two fillings were produced having about 22% of fat, with the formulations given in the Table below. The fats in filling C and in filling D displayed the following characteristics:

| Characteristics of fats, used in fillings C and D | | | |
|---|---|---|---|
| filling | $N_{20}$ (stab) | $N_{25}$ (stab) $N_{25}$ (unstab) | carbon no. distribution |
| C | 7.3 | 0.83 | $C_{28}$:0.1 |
|  |  |  | $C_{30}$:0.5 |
|  |  |  | $C_{32}$:1.7 |
|  |  |  | $C_{34}$:2.1 |
|  |  |  | $C_{36}$:2.7 |
|  |  |  | $C_{38}$:3.7 |
|  |  |  | $C_{40}$:1.9 |
|  |  |  | $C_{42}$:2.6 |
|  |  |  | $C_{44}$:2.5 |
|  |  |  | $C_{46}$:2.2 |
|  |  |  | $C_{48}$:4.4 |
|  |  |  | $C_{50}$:4.5 |
|  |  |  | $C_{52}$:21.2 |
|  |  |  | $C_{54}$:46.4 |
|  |  |  | $C_{56}$:2.8 |
|  |  |  | $C_{58}$:0.6 |
|  |  |  | $C_{60}$:0.2 |
| D | 48.7 | 2.0 | $C_{44}$:0.1 |
|  |  |  | $C_{46}$:0.5 |
|  |  |  | $C_{48}$:4.1 |
|  |  |  | $C_{50}$:55.5 |
|  |  |  | $C_{52}$:29.8 |
|  |  |  | $C_{54}$:9.2 |
|  |  |  | $C_{56}$:0.6 |
|  |  |  | $C_{58}$:0.2 |

|  | Filling C | Filling D |
|---|---|---|
| Fat phase: |  |  |
| Fat | 22.3 | 22.4 |
| Monoglyceride | 0.6 | 0.6 |

| Characteristics of fats, used in fillings C and D -continued | | |
|---|---|---|
| emulsifier** |  |  |
| Aqueous: |  |  |
| Maltodextrin* | 23.0 | 23.0 |
| Polydextrose: Litesse | 34.0 | 34.1 |
| Potassium sorbate | 0.15 | 0.15 |
| Flavour | 0.12 | 0.4 |
| Water | 19.8 | 19.4 |
| Lactic acid | to pH 4.9 | to pH 4.9 |

*Maltodextrin 63DE.CS
**Hymono 7804

A premix was made and held in a tank at 70° C. The premix was processed in both cases by passing through a Votator® C-unit (pin stirrer) operating at 1000 rpm., then through two Votator® A-units (scraped surface heat exchangers) operating at 350 and 700, respectively. The product flow rate through the system was 19 g/minute for filling C and 8 g/min for filling D. Processing exit temperatures for the three units were: 50°, 8°, and 16° C. for filling C and 50° C., 14° C. and 21° C. for filling D, respectively.

The fat continuity of the fillings was confirmed by conductivity measurements and also by spraying a mixture of powdered dyes on to the products. The dyes used were Malachite Green and Sudan III. The former dye is water-soluble and the latter is fat-soluble. Thus, a fat-continuous product dissolves the Sudan III, giving a red-orange colour. Similarly, a water-continuous product dissolves the Malachite Green, giving a blue-green colour.

Both filling C and filling D gave a red-orange colour when sprayed with the dye mixture, indicating that a fat-continuous product is involved.

The fillings were deposited into milk and dark chocolate shells (Felchin® ⅜" chocolate half-shells) which were then backed off and sealed with chocolate. The filled shells were stored at 20° C. and 10° C. and monitored visually for changes.

After 6 weeks, at 20° C. shells containing filling C had cracked and filling was escaping. Shells containing filling C did not crack until after 4 months storage at 10° C. Fillings D did not crack in the 3 months they were stored at 20 and 10° C.

The calorie content of filling C was 350 kcal/100 g compared to 330 kcal/100g for filling D.

EXAMPLE 6

Example 5 was repeated with a formulation with the following composition:

| cocoa butter | 19.1% |
|---|---|
| butter oil | 3.4% |
| monoglyceride emulsifier | 0.6% |
| water | 19.0% |
| potassium sorbate | 0.15% |
| glucose syrup 63DE | 22.0% |
| poly dextrose: Litesse | 35.0% |
| flavour | 0.8% |

The characteristics for the fat phase are:
$N_{20}$ (stab)=63.4
$N_{25}$ (stab)=8.17
$N_{25}$ (not stab)

| carbon number distribution: | |
|---|---|
| $C_{40}$:1.7% | $C_{52}$:42.1 |

-continued carbon number distribution:

| | |
|---|---|
| $C_{42}$:1.1% | $C_{54}$:30.8 |
| $C_{44}$:1.0% | $C_{56}$:0.9 |
| $C_{46}$:1.2% | $C_{58}$:0.3 |
| $C_{48}$:1.9% | $C_{60}$:0.1 |
| $C_{50}$:17.9% | |

The processing was performed in three C-units, each at 1000 rpm and at exit temperatures of 44° C. 24° C. and 25° C., respectively. The throughput was 27 g/min. The filled Felchin-shells were still intact after 3 months on storage at 20° C. and at 10° C.

EXAMPLE 7

A low calorie filling was prepared with the following composition:

| | wt % |
|---|---|
| fat D of example 5 | 21.3 |
| monoglyc. emulsifier* | 0.5 |
| flavour | 0.1 |
| polydextrose: Litesse | 37.0 |
| maltodextrin-63DE | 25.4 |
| water | 15.6 |

*Hymono 7804

The processing was performed in three C-units, each at 1000 rpm and at exit temperatures of 44° C.; 25° C. and 26° C., respectively. The throughput was 16 g/min. The fillings were placed inside dark chocolate Felchin shells and the shells were intact after 2 months at 20° C. The samples had a pleasant taste.

It is claimed:

1. A low-calorie confectionery product comprising a filling composition and a coating layer encapsulating the filling, the coating layer representing up to 60 wt. % of the product, and wherein the filling composition consists of a fat-continuous emulsion which has a fat content of 5–50 wt. % and 95–50 wt. % of a remainder which is 10–50 wt. % water and 90–50 wt. % of functionally effective amounts of a thickener, sweetener and at least one other of the following components: acidity regulator, bulking agent, emulsifier, flavour, colourant, humectant and preservative, the weight ratio of thickener and sweetener:water in the emulsion being >1.5.

2. The low-calorie confectionery product of claim 1, wherein the fat-continuous emulsion is a non-aerated emulsion.

3. The low-calorie confectionery product of claim 1, wherein the fat content of the fat-continuous emulsion is 5–40 wt %.

4. The low-calorie confectionery product of claim 1, wherein the water content of the remainder is 15–25 wt %.

5. The low-calorie confectionery product of claim 1, wherein the thickener is a gelling agent, which is present in an amount of 1–8 times its critical gelling concentration.

6. The low-calorie confectionery product of claim 1, wherein the thickener is selected from the group consisting of
gelatin, hydrolyzed gelatin, casein, caseinates, vegetable proteins denatured proteins;
potato starch, corn starch, maize starch, tapioca starch, xanthan gum, pectin, agar, carrageenan gum, polydextrose, maltodextrins, hydrolyzed starch, and modified starch.

7. The low-calorie confectionery product of claim 6, wherein the thickener is polydextrose or mixture thereof with maltodextrin and the weight ratio of thickener and sweetener:water in the emulsion is 2–9.

8. The low-calorie confectionery product of claim 7, wherein polydextrose and maltodextrin are present in the composition in a weight ratio of polydextrose to maltodextrin of more than 0.7.

9. The low-calorie confectionery product of claim 1, wherein the bulking agent is selected from the group consisting of powdered cellulose, microcrystalline cellulose, insoluble fibres and plant fibres.

10. The low-calorie confectionery product of claim 1, wherein the thickener or the bulking agent have a particle size of 0.1–50 μm.

11. The low-calorie confectionery product of claim 1, wherein the emulsifier is selected from the group consisting of monoglycerides, lecithins, DATA esters and lactodans.

12. The low-calorie confectionery product of claim 1, wherein the sweetener is selected from the group consisting of lactose, sucrose, fructose, glucose and high-intensity sweeteners.

13. The low-calorie confectionery product of claim 1, wherein the fat comprises at least a vegetable fat, which is selected or derived from the group consisting of soft fractions of cocoa butter, illipe, shea, palm, sal, soybean, cottonseed, palmkernel, coconut, rapeseed and sunflower.

14. The low-calorie confectionery product of claim 13, wherein the fat displays an $N_{25}$ (stab):$N_{25}$ (not stab) $\geq 1.5$ and an $N_{20}$ (stab) $< 70$.

15. The low-calorie confectionery product of claim 14, wherein $N_{25}$ (stab): $N_{25}$ (not stab) $\geq 1.8$.

16. The low-calorie confectionery product of claim 15, wherein the fat comprises a fat blend of at least one member of the group consisting of cocoa butter, cocoa butter equivalents and fractions thereof, and at least 10 wt % of another fat.

17. The low-calorie confectionery product of claim 16, wherein the fat is a blend of palm mid-fraction and palm oil olein in a weight ratio 80:20–20:80.

18. The low-calorie confectionery product of claim 1, wherein the humectant is selected from the group consisting of glycerol and hygroscopic, food-grade inorganic and organic salts.

19. The low-calorie confectionery product of claim 1, wherein the emulsion has a pH of less than 5.5.

20. The low-calorie confectionery product of claim 1 that is microbiologically and structurally stable at ambient temperature for at least 4 weeks.

21. The low-calorie confectionery product of claim 1 wherein the filling is encapsulated in a coating layer, comprising a shell representing 20–50 wt % of the total product.

22. The low-calorie confectionery product of claim 21, wherein the filling is separated from the shell by a barrier layer having a watervapour-permeability of less than 3 g. mil/m².d. mm Hg.

23. The low-calorie confectionery product according to claim 22, wherein the barrier layer is made of a material selected from the group consisting of shellac, hard fat having an $N_{20} > 50$ (NMR pulse, stabilized), natural wax, combinations of fat, and sugars and high-melting sucrose poly fatty acid esters having an $N_{20} > 50$.

24. The product of claim 1 wherein the fat content of the fat-continuous emulsion is 10–30 wt. % and the remainder of the emulsion is 90–70 wt. %.

* * * * *